(12) United States Patent
Mori et al.

(10) Patent No.: US 7,147,523 B2
(45) Date of Patent: Dec. 12, 2006

(54) POWER GENERATING AND PROPELLING SYSTEM OF VESSEL

(75) Inventors: Hisanori Mori, Osaka (JP); Mitsuhiro Nakagaki, Osaka (JP); Takayuki Toda, Osaka (JP); Junichi Hitachi, Osaka (JP)

(73) Assignee: Yanmar Co., Ltd. (JP)

( * ) Notice: Subject to any disclaimer, the term of this patent is extended or adjusted under 35 U.S.C. 154(b) by 27 days.

(21) Appl. No.: 10/789,022

(22) Filed: Feb. 27, 2004

(65) Prior Publication Data

US 2004/0192123 A1    Sep. 30, 2004

Related U.S. Application Data

(63) Continuation of application No. PCT/JP02/08714, filed on Aug. 28, 2002.

(30) Foreign Application Priority Data

Sep. 11, 2001  (JP)  ............................. 2001-275193

(51) Int. Cl.
   B63H 21/20    (2006.01)
   B63H 21/17    (2006.01)
   B63L 11/01    (2006.01)

(52) U.S. Cl. .............................................. 440/3; 440/6

(58) Field of Classification Search .................... 440/3, 440/4, 6, 75, 84, 86; 477/2–6; 74/661; 180/65.2, 65.3, 65.4
See application file for complete search history.

(56) References Cited

U.S. PATENT DOCUMENTS

| 2,466,525 A | * | 4/1949 | Wilson | ........................ 165/282 |
| 3,225,732 A | * | 12/1965 | Carlsen | ......................... 440/3 |
| 3,543,518 A | * | 12/1970 | Shibata | ........................ 290/4 R |
| 5,616,056 A | | 4/1997 | Meissner | |
| 6,244,915 B1 | | 6/2001 | Ozawa | |

FOREIGN PATENT DOCUMENTS

| EP | 1013544 A2 | * | 6/2000 |
| GB | 2170664 A | * | 8/1986 |
| JP | 54087339 A | * | 7/1979 |
| JP | 59153690 A | * | 9/1984 |
| JP | 02014999 A | * | 1/1990 |
| JP | 02262495 A | * | 10/1990 |
| JP | 08230785 A | * | 9/1996 |
| JP | 2001270495 A | * | 10/2001 |
| JP | 2001301692 A | * | 10/2001 |
| SU | 1421615 A | * | 9/1988 |

OTHER PUBLICATIONS

Publication No. 4-102736, Date of Publication: Sep. 4, 1992.
Patent Abstracts of Japan. Publication No. 05-246386, Date of Publication: Sep. 24, 1993; Title: Complex Propulsion Control Device For Marine Use.
Patent Abstracts of Japan. Publication No. 08-230785, Date of Publication: Sep. 10, 1996; Title: Ship Provided with Auxiliary Electric Propulsion Equipment.

(Continued)

Primary Examiner—Ajay Vasudeva
(74) Attorney, Agent, or Firm—Sterne, Kessler, Goldstein & Fox P.L.L.C.

(57) ABSTRACT

An electric power generating equipment (10) is provided between an internal combustion engine (2) and a power transmission device (3), and an electric motor (9) is disposed at an area of the power transmission device. An output shaft (9a) of the electric motor (9) is disposed coaxially to any of rotary shafts of the power transmission device (3).

20 Claims, 10 Drawing Sheets

OTHER PUBLICATIONS

Patent Abstracts of Japan. Publication No. 10/278888, Date of Publication: Oct. 20, 1998; Title: Engine Exhaust System Cooling Device of Small Planing Boat.

Patent Abstracts of Japan. Publication No. 2000-062696, Date of Publication: Feb. 29, 2000; Title: Cooling Structure of Oil Pump for Small Vessel.

* cited by examiner

POWER GENERATING AND PROPELLING SYSTEM OF VESSEL

TECHNICAL FIELD OF THE INVENTION

The present invention relates to the construction of a propelling machine of a vessel, which is provided with an electric motor in addition to an engine as a power source for propelling the vessel, so that the vessel can be propelled by the engine with assist of the electric motor or by only the electric motor.

BACKGROUND ART

Conventionally, a propelling machine of a vessel comprises an internal combustion engine, a power transmission device, and others. The power transmission device decelerates driving force of the engine, and drives a propeller connected to the power transmission device. When the vessel is propelled, the engine is always driven. Even if the vessel sails at low speed, the propeller is driven by the engine. Consequently, exhaust gas, vibration and noise always occur while propelling.

Moreover, inboard electrical equipments are supplied with electric power stored in a battery. A generator for charging electric power to the battery is attached to the internal combustion engine of the propelling machine.

Unless the vessel sails at maximum speed, the internal combustion engine driving the propeller reserves power at any rotational speed because its maximum output force is larger than load on the vessel.

In view of the above, the present invention is directed to establish an arrangement of an electric motor in a propelling machine, wherein reserved power of an internal combustion engine is converted into electric power for driving the electric motor so that a propeller can be driven by only the electric motor or by the engine with assist of the electric motor.

In the above aspect, the present invention is also directed to establish a mechanism for preventing excessive torque and protecting shafts when output power of the electric motor is transmitted to the propelling system, and to establish a cooling manner for stabilizing output power of the electric motor.

SUMMARY OF THE INVENTION

According to the present invention, a power generating equipment is installed between an internal combustion engine and a power transmission device, and an electric motor is disposed on the power transmission device.

Therefore, the vessel can drive a propeller so as to sail not only by the internal combustion engine but also by the electric motor, and by the internal combustion engine supported by the electric motor. Accordingly, occurrence of exhaust gas, vibration and noise can be suppressed, thereby improving environment-friendliness. Furthermore, the electric motor disposed on the power transmission device facilitates for easy attachment, detachment and maintenance thereof. Moreover, when a clutch is switched for gearshift, the drive of the electric motor can be easily controlled.

According to the present invention, a rotary shaft of the electric motor is disposed coaxially with any of rotary shafts of the power transmission device.

Due to such a simple arrangement, the rotary shaft of the electric motor can be easily connected to the rotary shaft of the power transmission device without a complicated gear mechanism or the like, thereby reducing required parts and facilitating for easy assembly and maintenance.

Alternatively, according to the present invention, the rotary shaft of the electric motor is disposed eccentrically and parallel to any of rotary shafts of the power transmission device.

Therefore, when the propeller is driven by the electric motor, the rotational driving force of the electric motor can be gear-shifted and transferred to the propeller. Moreover, such a simple arrangement facilitates for easily connecting the output shaft of the electric motor to the rotary shaft of the transmission, for reducing required parts, and for easy assembly and maintenance.

According to the present invention, the rotary shaft of the electric motor transfers power to the transmission through a torque limiter.

Therefore, the rotary shaft of the transmission and the rotary shaft of the electric motor are protected from excessive stress, thereby improving the reliability of the propelling system. Since the rotary shaft of the power transmission device is connected with the rotary shaft of the electric motor through the torque limiter, the electric motor can be easily attached or detached to and from the power transmission device so as to improve facilitation of assembly when attaching the electric motor to the power transmission device and maintainability of the electric motor.

Alternatively, according to the present invention, the rotary shaft of the electric motor transfers power to the power transmission device through an elastic joint.

Therefore, the rotary shaft of the power transmission device and the rotary shaft of the electric motor are protected from excessive stress, thereby improving the reliability of the propelling machine. Since the rotary shaft of the power transmission device is easily connected to the rotary shaft of the electric motor through the elastic joint, the electric motor can be easily attached or detached to and from the power transmission device so as to improve facilitation of assembly when attaching the electric motor to the power transmission device and maintainability of the electric motor. Furthermore, the elastic joint is constructed so simply as to save costs for making a mechanism for protecting shafts.

Alternatively, according to the present invention, the rotary shaft of the electric motor transfers power to the power transmission device through a clutch.

Therefore, at the time of driving the propeller by the electric motor (including the time that the electric motor assists the internal combustion engine), the clutch is set to rotate the rotary shaft of the power transmission device integrally with the rotary shaft of the electric motor. At the time of driving the propeller only by the internal combustion engine, the clutch is set to separate the rotary shaft of the power transmission device from the electric motor so as to make the rotary shaft of the power transmission device rotatable relative to the rotary shaft of the electric motor, thereby reducing mechanical loss of driving force. When the electric motor is troubled with breakdown or another, the rotary shaft of the power transmission device can be separated from the rotary shaft of the electric motor so as to facilitate propelling the vessel by the internal combustion engine. Furthermore, by connecting the rotary shaft of the electric motor and the rotary shaft of the power transmission device through the clutch, the electric motor can easily be attached or detached to and from the power transmission device, thereby improving facilitation of assembly when attaching the electric motor to the power transmission device and maintainability of the electric motor.

According to the present invention, cooling water for cooling the internal combustion engine is passed near the electric motor.

Therefore, the electric motor and surroundings can be cooled efficiently while ensuring facilitation of assembly and maintenance of the electric motor. The electric motor is prevented from heating, thereby improving stability and reliability of the power generating system and the propelling system of the propelling machine.

Furthermore, according to the present invention, the cooling water is taken in from the outside of the propelling machine of the vessel.

Therefore, the cooling system can be inexpensively constructed while ensuring facilitating of assembly and maintenance of the electric motor. Furthermore, the cooling water circuit for cooling the electric motor and others can be inexpensive because it requires a separate pumping system.

Furthermore, according to the present invention, the cooling water is circulated in a closed circuit provided in the propelling machine of the vessel.

Therefore, by using the cooling water after cooling the electric motor for inboard warm water supply etc., wasted heat can be used efficiently while ensuring facilitation of assembly and maintenance of the electric motor.

BEST MODE FOR CARRYING OUT THE INVENTION

The present invention will be detailed in accordance with accompanying drawings.

Figure 1:
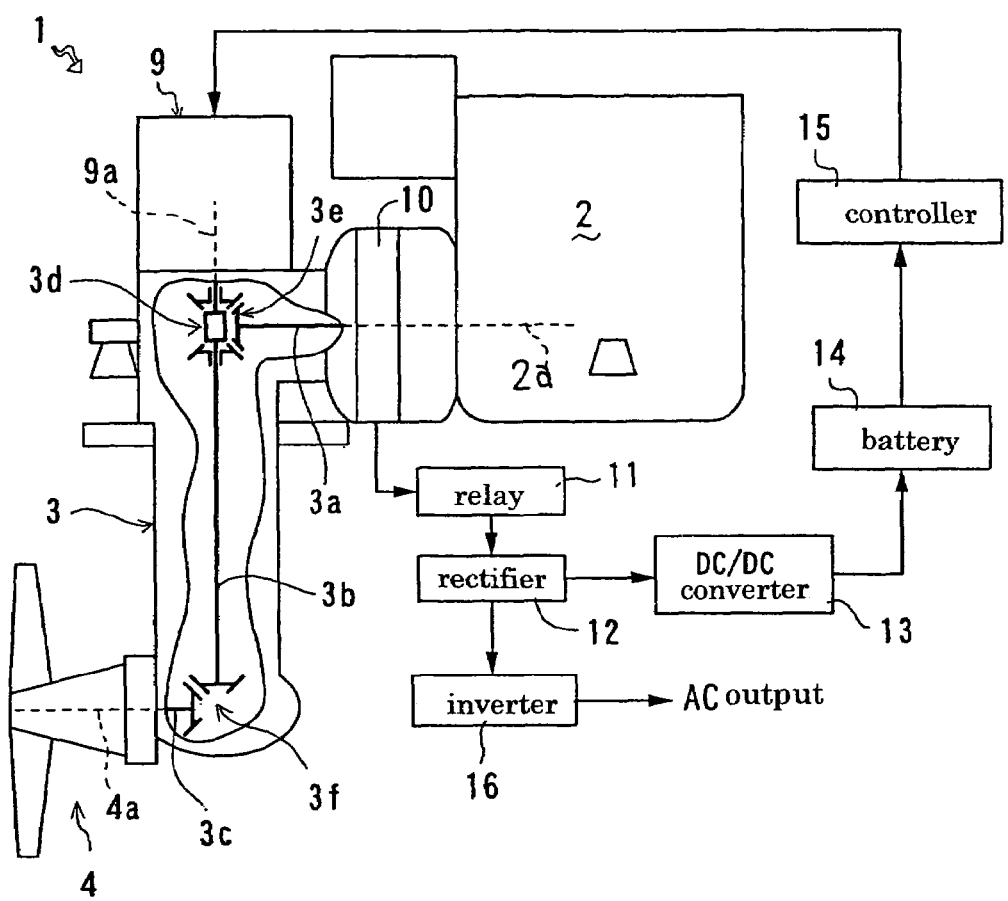
FIG. 1 is a sectional side view of a propelling machine of a vessel having a power generating and propelling system according to the present invention.
Figure 2:
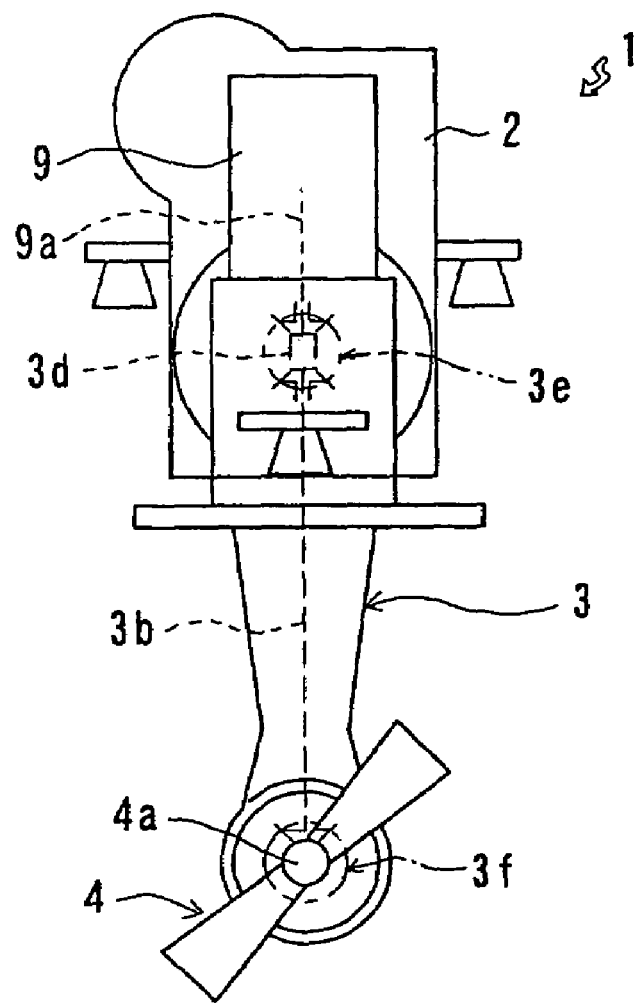
FIG. 2 is a rear view of the above.

A propelling machine employing a power generation and propelling system of a vessel according to the present invention will be described. A propelling machine 1 shown in FIGS. 1 and 2 has an internal combustion engine 2 and a power transmission device 3, which is constructed as a sail drive system and connected with a propeller 4. Driving force from the internal combustion-engine 2 is transferred to the propeller 4 while being decelerated by the power transmission device 3, thereby rotating the propeller 4.

Additionally, with regard to the propelling machine 1, an electric power generating equipment 10 having a generator or characteristics thereof is interposed between the internal combustion engine 2 and the power transmission device 3. The power generating equipment 10 is driven by the internal combustion engine 2 so as to generate electric power, which is used for driving a later-discussed electric motor and for supply of electric power to inboard electric appliances.

A power train from the internal combustion engine 2 to the propeller 4 will be described. A crankshaft 2a of the internal combustion engine 2 is connected with a substantially horizontal input shaft 3a of the power transmission device 3.

In the power transmission device 3 is provided a first bevel gear portion 3e, where a substantially vertical transmission shaft 3b is connected at its upper end to the input shaft 3a through a clutch 3d, and a second bevel gear portion 3f, where the transmission shaft 3b is connected at its lower end to an output shaft 3c.

The output shaft 3c of the power transmission device 3 is connected with a drive shaft 4a of the propeller 4.

The output power of the internal combustion engine 2 is transferred from the crankshaft 2a to the input shaft 3a of the power transmission device 3, and transferred to the drive shaft 4a of the propeller 4 through the clutch 3d, the transmission shaft 3b and the output shaft 3c.

The clutch 3d selectively couples or uncouples the input shaft 3a to and from the transmission shaft 3b, and switches the rotational direction of the transmission shaft 3b when transmitting rotation of the input shaft 3a to the transmission shaft 3b.

An electric motor 9 is mounted on a top of the power transmission device 3. An output shaft 9a of the electric motor 9 is connected to the transmission shaft 3b through the clutch 3d. The clutch 3d couples or uncouples the output shaft 9a to and from the transmission shaft 3b. The output shaft 9a serving as a rotary shaft of the electric motor 9 is disposed in parallel and coaxially to the transmission shaft 3b, which is one of rotary shafts of the power transmission device 3.

The power generating equipment 10 is a high-frequency generator having an output part connected to a battery 14 through a relay (electromagnetic switch) 11, a rectifier 12 and a DC/DC converter 13 in this order. The battery 14 is connected to the electric motor 9 through a controller 15.

The rectifier 12 rectifies and smoothes alternating current electric power generated by the power generating equipment 10, and converts it into direct current power. Then, the DC/DC converter 13 transforms the power to a predetermined voltage and charges it into the battery 14.

The electric motor 9 is driven by the power charged in the battery 14, and the drive of the electric motor 9 is controlled by the controller 15.

The power from the power generating equipment 10, which is rectified and smoothed by the rectifier 12, is converted into alternating current electric power by an inverter 16 so as to be supplied to inboard equipments.

With regard to the propelling machine 1 constructed as the above, the drive of propeller 4 can be selected from three patterns by switching of the clutch 3d: The first pattern is that the propeller 4 is driven by only the internal combustion engine 2; the second pattern is that the propeller 4 is driven by the internal combustion engine 2 with assist of the electric motor 9; and the third pattern is that the propeller 4 is driven by only the electric motor 9.

In this case, the controller 15 is connected to the clutch 3*d* so as to switch the clutch 3*d*.

Accordingly, the power generating equipment 10 is interposed between the internal combustion engine 2 and the power transmission device 3, and the electric motor 9 is disposed at an area of the power transmission device 3, whereby the propeller 4 is driven by the internal combustion engine 2, by the electric motor 9, or by the internal combustion engine 2 with assist of the electric motor 9.

Therefore, occurrence of exhaust gas, vibration and noise can be suppressed, thereby improving environment-friendliness.

The electric motor 9 disposed at the area of the power transmission device 3 facilitates for its easy attachment, detachment and maintenance. Moreover, the drive of the electric motor 9 can be controlled easily when the clutch 3*d* is switched for gearshift.

The output shaft 9*a* of the electric motor 9, which is simply disposed coaxially to the transmission shaft 3*b* of the power transmission device 3, can be connected to the transmission shaft 3*b* without a complicated gear mechanism or the like, thereby saving a parts count and facilitating for easy assembly and maintenance.

Figure 3:
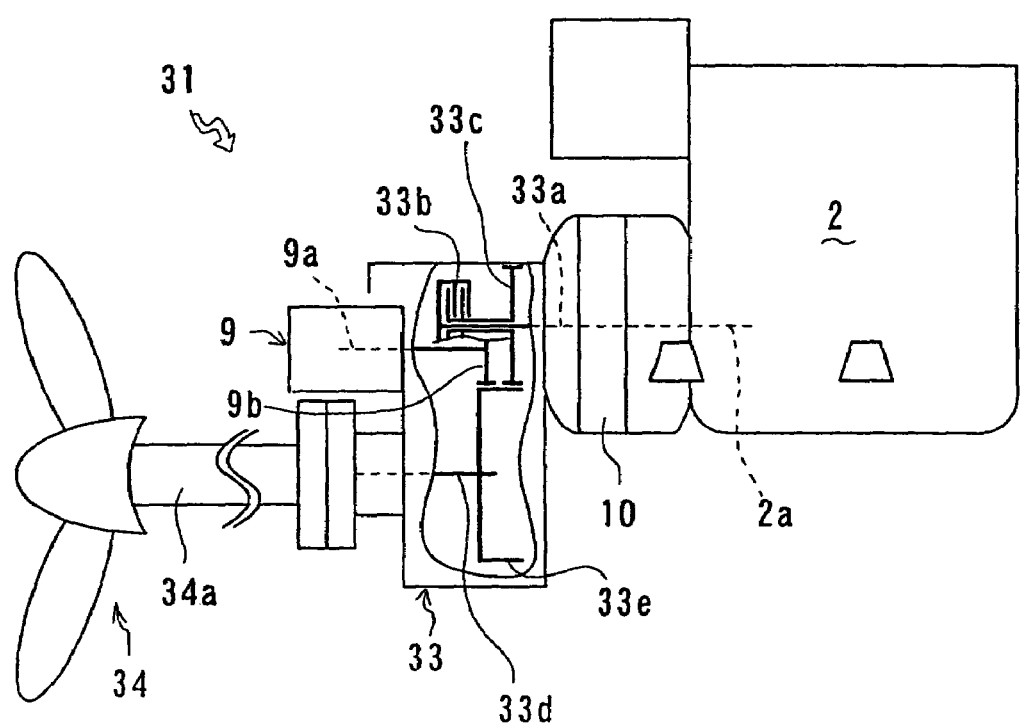
FIG. 3 is a sectional side view of a propelling machine of a vessel according to a second embodiment.
Figure 4:
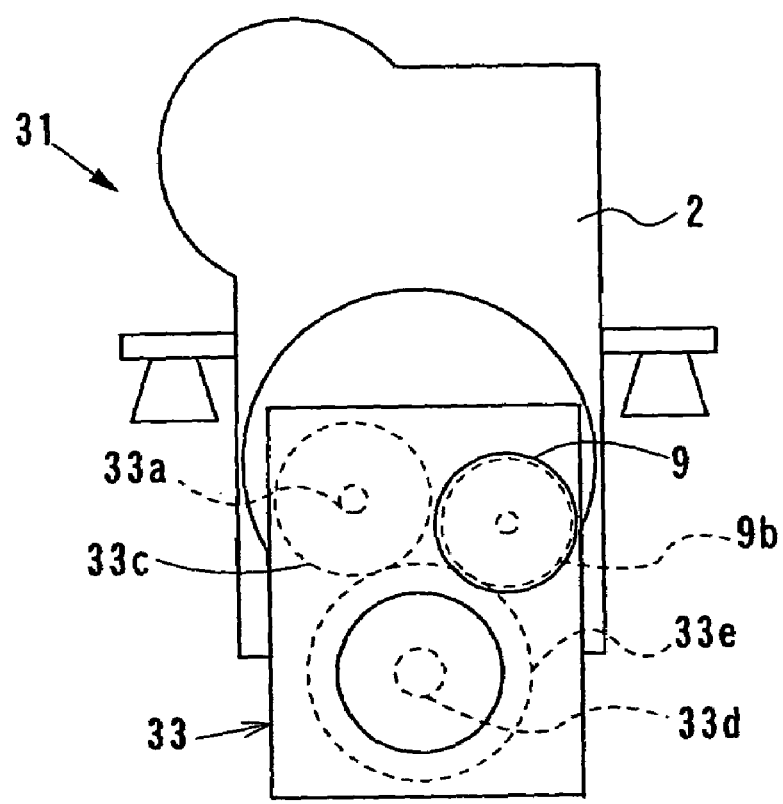
FIG. 4 is a rear view of the above.

Alternatively, the electric motor 9 may be disposed at the area of the power transmission device 3 in the following way:

A power transmission device 33 of a propelling machine 31 shown in FIGS. 3 and 4 is constructed as a marine gear system, and an output shaft 33*a* of the power transmission device 33 is connected with the crankshaft 2*a* of the internal combustion engine 2.

The input shaft 33*a* is connected with a first gear 33*c* through a clutch 33*b*, and the first gear 33*c* meshes with a second gear 33*e* fixed on an output shaft 33*d*. The output shaft 33*d* is connected with a drive shaft 34*a* of a propeller 34, which is equipped to a lower rear end of the power transmission device 33.

The power of the internal combustion engine 2 is transferred from the crankshaft 2*a* to the input shaft 33*a* of the power transmission device 33, and transferred to the drive shaft 4*a* of the propeller 4 through the clutch 33*b*, the first gear 33*c*, the second gear 33*e* and the output shaft 33*d*.

The clutch 33*d* couples or uncouples the input shaft 33*a* to and from the first gear 33*c*, and switches the rotational direction of the first gear 33*c* when transmitting rotation of the input shaft 33*a* to the first gear 33*c*.

The electric motor 9 is attached onto the upper rear end of the power transmission device 33. A drive gear 9*b* is fixed on the output shaft 9*a* of the electric motor 9 and meshes with the second gear 33*e* of the power transmission device 33.

The output shaft 9*a*, which is a rotary shaft of the electric motor 9, is disposed eccentrically and parallel to the input shaft 33*a* and the output shaft 33*d*, i.e., rotary shafts of the power transmission device 3, and to the crankshaft 2*a* of the internal combustion engine 2.

Accordingly, the electric motor 9 is drivingly connected to the propeller 4 through the second gear 33*c*, whereby the propeller 4 can be driven by the internal combustion engine 2 with assist of the electric motor 9 or by only the electric motor 9 similarly to the above-mentioned manner.

The output shaft 9*a* of the electric motor 9 is disposed eccentrically and parallel to the input shaft 33*a* and the output shaft 33*d* of the power transmission device 3, and connected to the propeller 4 through the drive gear 9*b* and the second gear 33*e*. Therefore, when the propeller 4 is driven by the electric motor 9, the rotational driving force of the electric motor 9 can be speed-changed and transferred to the propeller 4 by the drive gear 9*b* and the second gear 33*e*.

The simple structure of connecting the output shaft 9*a* of the electric motor 9 to the output shaft 33*d* of the power transmission device 33 saves a parts count and facilitates for easy assembly and maintenance.

Some structures for transferring power from the input shaft 9*a* of the electric motor 9 to the transmission shaft 3*b* of the power transmission device 3 will now be described.

Figure 5:
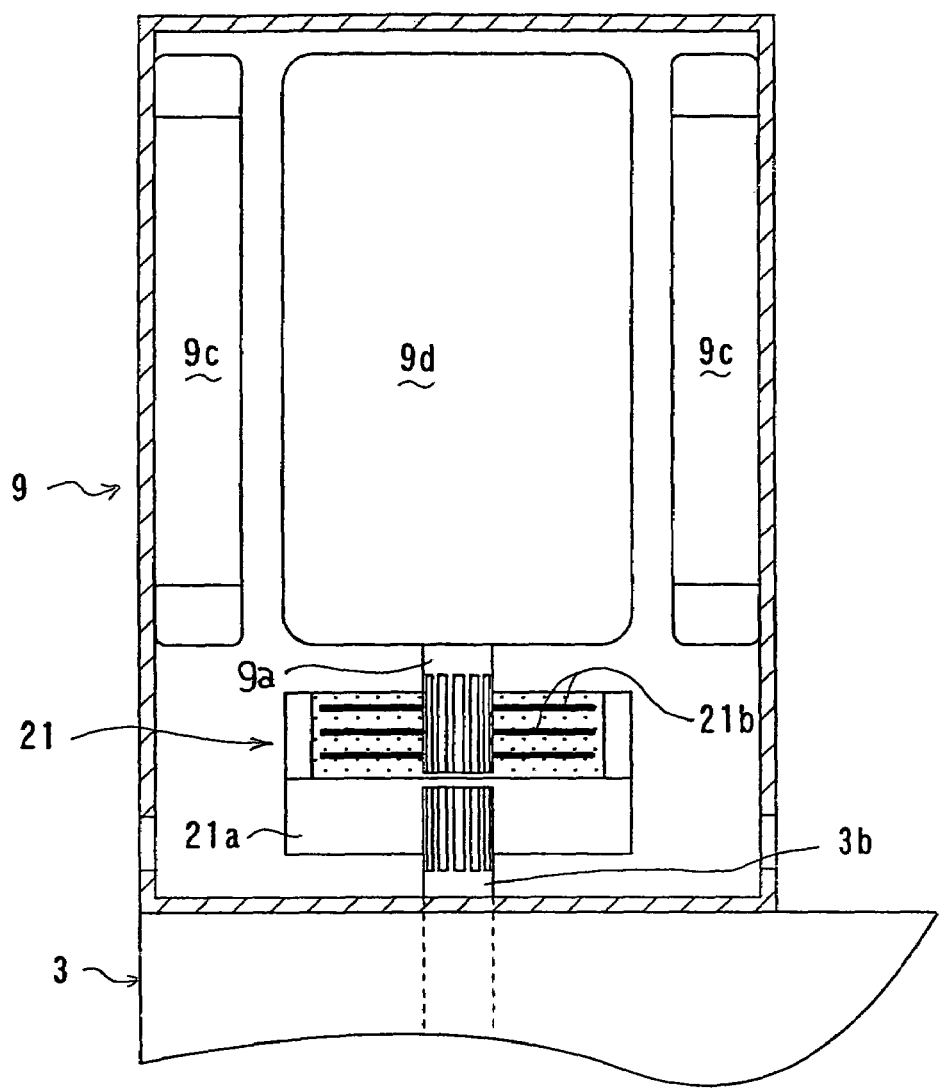
FIG. 5 is a sectional side view of an electric motor having an output shaft connected to a power transmission device through a torque limiter.

As shown in FIG. 5, a magnet rotor 9*d*, which is rotatable integrally with the output shaft 9*a*, is disposed at the center portion of the electric motor 9, and stator coils 9*c* are disposed along the outer periphery of the magnet rotor 9*d*, thereby constituting the electric motor 9.

The transmission shaft 3*b* of the power transmission device 3 is upwardly inserted into the electric motor 9 and connected to the output shaft 9*a* through a torque limiter 21.

The upper end of the transmission shaft 3*b* is splined, and a main part 21*a* of the torque limiter 21 is integrally-rotatably fitted onto the splined upper end of the transmission shaft 3*b*.

The lower end of the output shaft 9*a* is also splined, and friction disks 21*b* of the torque limiter 21 are integrally-rotatably fitted onto the splined lower end of the transmission shaft 3*b*.

If a torque applied onto the main part 21*a* is smaller than a predetermined value, the friction disks 21*b* of the torque limiter 21 rotate integrally with the main part 21*a*. If the torque applied onto the main part 21*a* is larger than the predetermined value, the friction disks 21*b* slip and rotate against the main part 21*a*.

Therefore, when the propeller 4 is normally driven by the electric motor 9 (or when the propeller 4 is driven by the electric motor 9 with the engine 2), the output shaft 9*a* and the transmission shaft 3*b* are rotated integrally. However, for example, when a large stress is suddenly applied to the transmission shaft 3*b*, the output shaft 9*a* and the transmission shaft 3*b* are rotated mutually relatively.

Accordingly, the transmission shaft 3*b* of the power transmission device 3 and the output shaft 9*a* of the electric motor 9 are protected from being stressed by excessively large force, thereby improving the reliability of the propelling machine 1.

The torque limiter 21 interposed between the transmission shaft 3*b* of the power transmission device 3 and the output shaft 9*a* of the electric motor 9 facilitates for easy attachment and detachment of the electric motor 9 to and from the power transmission device 3, thereby improving facilitation of assembly for attaching the electric motor 9 to the power transmission device 3 and maintainability of the electric motor 9.

Figure 6:
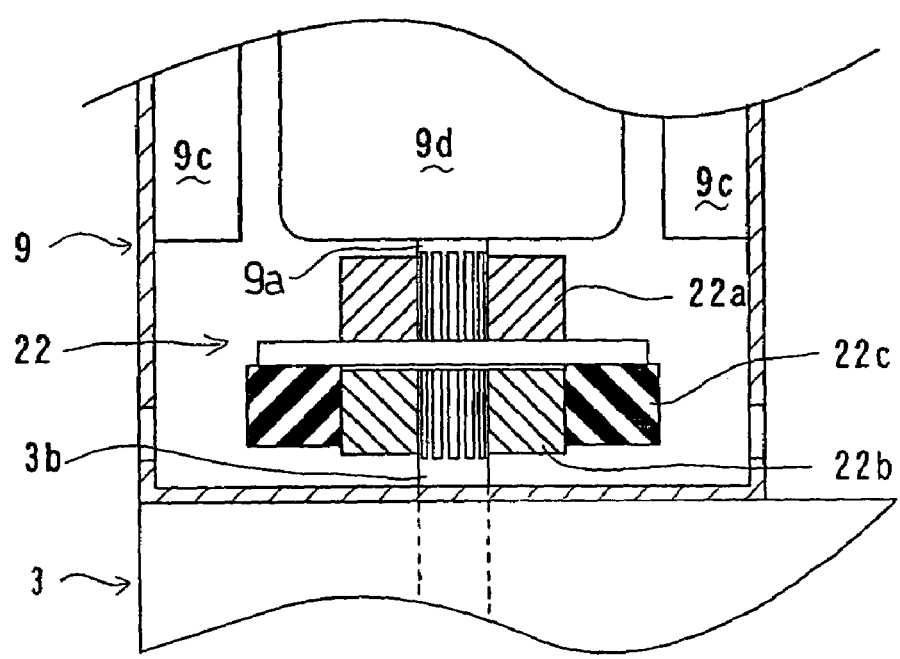
FIG. 6 is a sectional side view of the electric motor having an output shaft connected to the power transmission device through an elastic joint.

Alternatively, as shown in FIG. 6, the transmission shaft 3*b* of the power transmission device 3 may be connected to the output shaft 9*a* of the electric motor 9 through an elastic joint 22.

The elastic joint 22 has an upper body 22*a* and a lower body 22*b* mutually connected through an elastic member 22*c* made of rubber, elastomer or the like.

The splined lower end of the output shaft 9*a* is integrally-rotatably fitted into the upper body 22*a*, and the splined upper end of the transmission shaft 3*b* is integrally-rotatably fitted into the lower body 22*b*.

When a large force is applied onto one of the output shaft 9*a* and the transmission shaft 3*b* in their rotational direction, the output shaft 9*a* and the transmission shaft 3*b* slip off from each other by the elasticity of the elastic member 22c so as to prevent the large force from being directly transmitted to the other.

When the propeller 4 is normally driven by the electric motor 9 (or by the electric motor 9 with the engine 2), the output shaft 9a and the transmission shaft 3b are rotated mutually integrally. When a large force is suddenly applied on the transmission shaft 3b, for example, the output shaft 9a slips off from the transmission shaft 3b so as to weaken the force applied to the transmission shaft 3b, and then the force is transferred to the output shaft 9a.

Therefore, the transmission shaft 3b of the power transmission device 3 and the output shaft 9a of the electric motor 9 can be prevented from being excessively stressed, thereby improving the reliability of the propelling machine 1.

Also, the elastic joint 22 interposed between the output shaft 9a of the electric motor 9 and the transmission shaft 3b of the power transmission device 3 facilitates for easy attachment and detachment of the electric motor 9 to and from the power transmission device 3, thereby improving facilitation of assembly for attaching the electric motor 9 to the power transmission device 3 and maintainability of the electric motor 9.

Furthermore, the elastic joint 22 simply made by connecting the upper body 22a and the lower body 22b through the elastic member 22c serves as an inexpensive mechanism for protecting the shafts.

Figure 7:
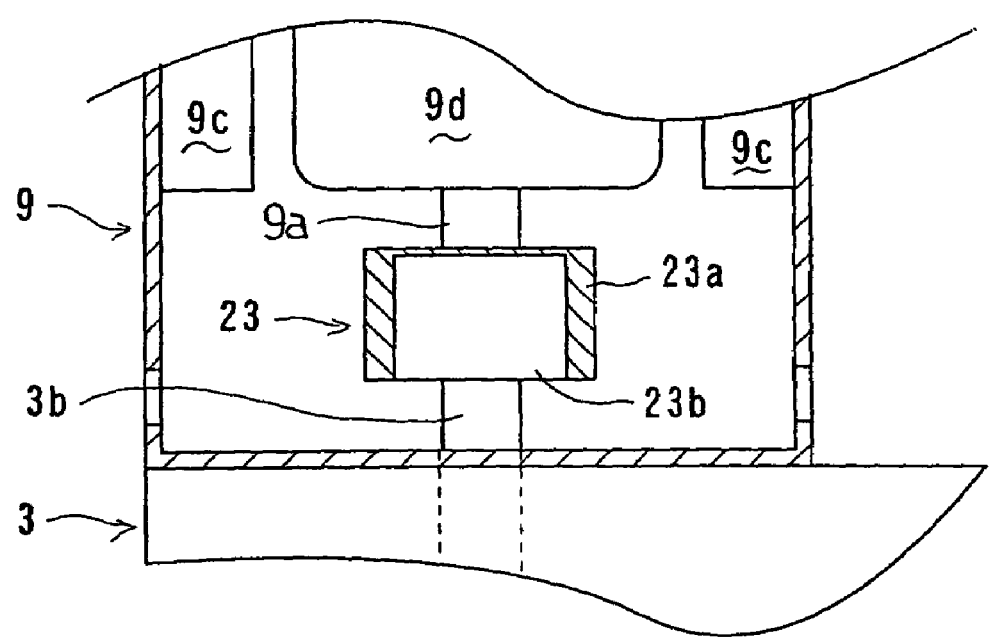
FIG. 7 is a sectional side view of the electric motor having an output shaft connected to the power transmission device through a clutch.

Alternatively, as shown in FIG. 7, the output shaft 9a of the electric motor 9 may be connected to the transmission shaft 3b of the power transmission device 3 through a clutch 23.

The clutch 23 comprises an upper body 23a and a lower body 23b, which are selectively rotatable integrally or relatively.

The lower end of the output shaft 9a is integrally-rotatably fitted into the upper body 23a. The upper end of the transmission shaft 3b is integrally-rotatably fitted into the lower body 23b.

When the propeller 4 is driven by the electric motor 9 (or by the electric motor 9 with the engine 2), the clutch 23 is switched to make the upper and lower bodies 23a and 23b integrally rotatable, thereby rotating the output shaft 9a and the transmission shaft 3b integrally. When the propeller 4 is driven by only the internal combustion engine 2, the clutch 23 is switched to make the upper and lower bodies 23a and 23b relatively rotatable so as to separate the output shaft 9a from the transmission shaft 3b, thereby reducing mechanical loss of driving force.

When the electric motor 9 is troubled by breakdown or another reason, the output shaft 9a and the transmission shaft 3b are separated from each other, thereby easily establishing propulsion of the vessel by the internal combustion engine 2.

Moreover, the clutch 23 interposed between the output shaft 9a of the electric motor 9 with the transmission shaft 3b of the power transmission device 3 through the clutch 23 facilitates for easy attachment and detachment of the electric motor 9 to and from the power transmission device 3, thereby improving facilitation of assembly for attaching the electric motor 9 to the power transmission device 3 and maintainability of the electric motor 9.

Next, explanation will be given of a mechanism for cooling the electric motor 9. The electric motor 9 is provided with an air-cooling mechanism and a water-cooling mechanism.

Figure 8:
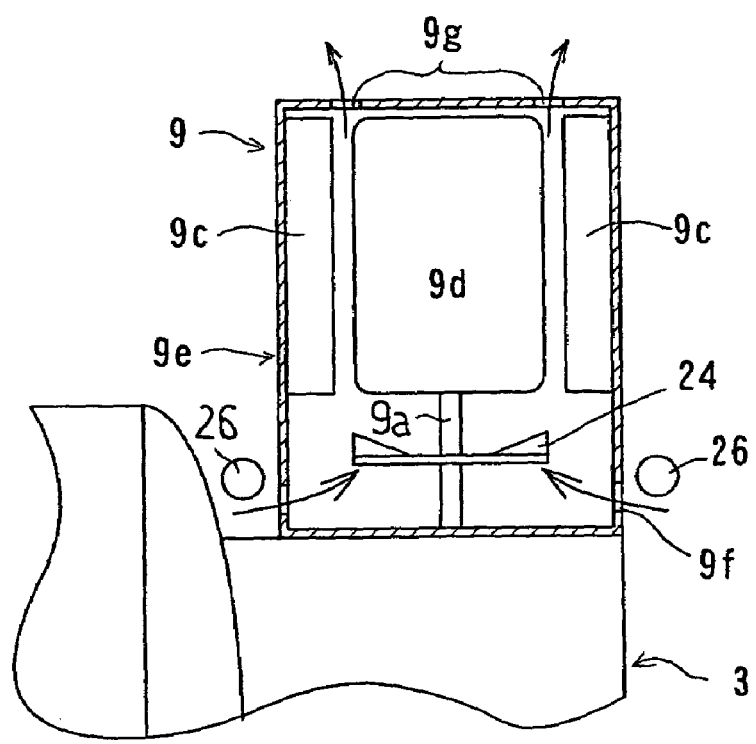
FIG. 8 is a sectional side view of a mechanism for air-cooling the electric motor.

Referring to the air-cooling mechanism as shown in FIG. 8, a cooling fan 24 is provided on the output shaft 9a of the electric motor 9. A casing 9e of the electric motor 9 is formed with a cooling-air intake 9f and a cooling-air outlet 9g.

By rotating the cooling fan 24 together with the output shaft 9a, the air is taken through the cooling-air intake 9f into the electric motor 9 so as to cool the components of the electric motor 9, such as the magnet rotor 9d and the stator coils 9c, and is discharged through the cooling-air outlet 9g to the outside.

The water-cooling mechanism will be described according to FIGS. 8 and 9.

Figure 9:
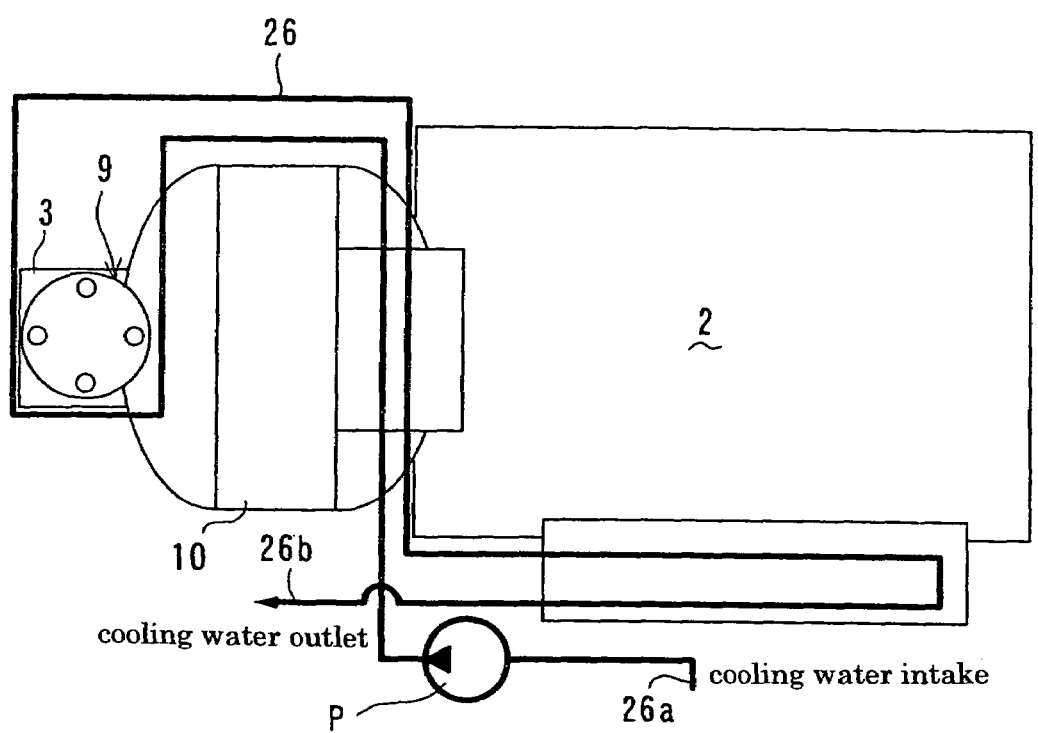
FIG. 9 is a diagram of a mechanism for water-cooling the electric motor having a cooling circuit which takes in cooling water from the outside of the propelling machine of a vessel.

The internal combustion engine 2 of the propelling machine 1 shown in FIG. 9 is provided with a cooling water circuit 26, and a pump P is provided near a cooling water intake 26a of the cooling water circuit 26.

The cooling water circuit 26 is piped near the internal combustion engine 2 and the electric motor 9 so as to cool the engine 2 and the electric motor 9.

The pump P introduces seawater, lakewater or other water out of the circuit through the cooling water intake 26a into the cooling water circuit 26 so as to serve as cooling water.

The cooling water taken in the cooling water circuit 26 cools the electric motor 9 firstly and the internal combustion engine 2 later, and then is discharged outward from the circuit through a cooling water outlet 26b.

In addition, the cooling water circuit 26 passes near the power generating equipment 10 between the cooling water intake 26a and the electric motor 9 so as to cool the power generating equipment 10.

In this way, the cooling water circuit 26 for cooling the internal combustion engine 2 is also used for cooling the electric motor 9 and the power generating equipment 10, whereby the electric motor 9 and the like can be cooled efficiently. Such prevention of heating the electric motor 9 improves stability and reliability of the power generation system and the propelling system in the propelling machine 1.

The above cooling mechanism can be provided inexpensively because of the cooling water circuit 26 supplied with cooling water of seawater, lakewater and the like from the cooling water intake 26a. Furthermore, there is no necessity of providing an additional pumping system in the cooling water circuit for cooling the electric motor 9 and others, thereby saving costs.

Figure 10:
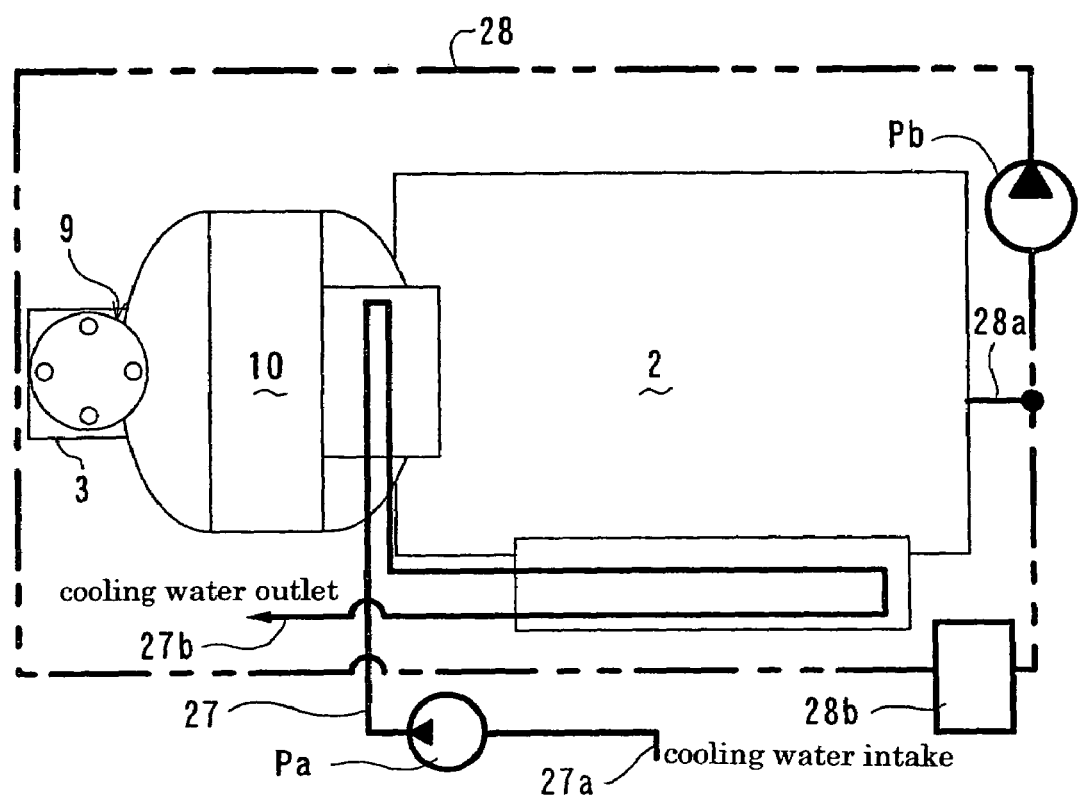
FIG. 10 is a diagram of a mechanism for water-cooling the electric motor, wherein cooling water is circulated in a cooling circuit provided within the propelling machine of a vessel.

An alternative mechanism for cooling the power generating equipment 10 may be constructed as following:

The internal combustion engine 2 of the propelling machine 1 shown in FIG. 10 is provided with a cooling water circuit 27, and a pump Pa is provided near a cooling water intake 27a of the cooling water circuit 27.

The cooling water circuit 27 is piped within the internal combustion engine 2. The pump Pa introduces seawater, lakewater or other water out of the circuit through the cooling water intake 27a into the cooling water circuit 27 so as to serve as cooling water. The cooling water taken in the cooling water circuit 27 cools the internal combustion engine 2, and then is discharged to the outside of the circuit through a cooling water outlet 27b.

Further, a fresh water circuit 28 is provided in the propelling machine 1. The fresh water circuit 28 is a closed circuit connected to an engine fresh water circuit 28a in the internal combustion engine 2. Fresh water as cooling water is circulated in the fresh water circuit 28 and the engine fresh water circuit 28a by a pump Pb. The fresh water circuit 28 is piped near the electric motor 9 so as to cool the electric motor 9.

In the fresh water circuit 28 is provided a hot-water tank 28b between the vicinity of the electric motor 9 and its junction with the engine fresh water circuit 28a, and at the downstream of the electric motor 9. The hot-water tank 28b stores warmed cooling water after cooling the electric motor 9 therein.

The stored cooling water in the hot-water tank 28b is used for inboard warm water supply or another purpose, so that wasted heat can be used efficiently.

Industrial Applicability

As the above, a power generation and propelling system of a vessel according to the present invention is applicable to a propelling machine of a vessel, such as a pleasure boat or a fishing boat.

The invention claimed is:

1. A power generating and propelling system of a vessel, comprising:
   an internal combustion engine;
   a power transmission device;
   an electric power generating equipment provided between the internal combustion engine and the power transmission device; and
   an electric motor disposed at an area of the power transmission device, wherein the power transmission device is selectively driven by the internal combustion engine independently, by the electric motor independently, or by the internal combustion engine and the electric motor collectively.

2. The power generating and propelling system of a vessel as set forth in claim 1, further comprising:
   a rotary shaft of the electric motor disposed coaxially to any of rotary shafts of the power transmission device.

3. The power generating and propelling system of a vessel as set forth in claim 2, wherein the rotary shaft of the electric motor transfers power to the power transmission device through a torque limiter.

4. The power generating and propelling system of a vessel as set forth in claim 2, wherein the rotary shaft of the electric motor transfers power to the power transmission device through an elastic joint.

5. The power generating and propelling system of a vessel as set forth in claim 2, wherein the rotary shaft of the electric motor transfers power to the power transmission device through a clutch.

6. The power generating and propelling system of a vessel as set forth in claim 1, further comprising:
   a rotary shaft of the electric motor disposed eccentrically and parallel to any of rotary shafts of the power transmission device.

7. The power generating and propelling system of a vessel as set forth in claim 1, wherein cooling water for cooling the internal combustion engine is passed near the electric motor.

8. The power generating and propelling system of a vessel as set forth in claim 7, wherein the cooling water is taken in from the outside of a propelling machine of the vessel.

9. The power generating and propelling system of a vessel as set forth in claim 7, wherein the cooling water is circulated in a closed circuit provided within a propelling machine of the vessel.

10. A power generating and propelling system of a vessel comprising:
    an internal combustion engine having a substantially horizontal crankshaft;
    a power transmission device having an input shaft, which is substantially coaxially connected to the crankshaft, and a substantially vertical transmission shaft;
    a propeller shaft having a height different from the input shaft, the power transmission device transmitting rotational force of the input shaft to the propeller shaft;
    an electric power generating equipment interposed between the internal combustion engine and the power transmission device; and
    an auxiliary electric motor for driving the propeller shaft, the electric motor being driven by electric power generated from the generating equipment, wherein the electric motor has an output shaft substantially coaxially connected to the substantially vertical transmission shaft of the power transmission device.

11. The power generating and propelling system of a vessel as set forth in claim 10, wherein the propelling shaft is lower than the input shaft, and wherein the electric motor is disposed upright on a top of the power transmission device.

12. The power generating and propelling system of a vessel as set forth in claim 11, wherein the output shaft of the electric motor transfers power to the power transmission device through a torque limiter.

13. The power generating and propelling system of a vessel as set forth in claim 11, wherein the rotary shaft of the electric motor transfers power to the power transmission device through an elastic joint.

14. The power generating and propelling system of a vessel as set forth in claim 11, wherein the rotary shaft of the electric motor transfers power to the power transmission device through a clutch.

15. The power generating and propelling system of a vessel as set forth in claim 10, wherein the output shaft of the electric motor transfers power to the power transmission device through a torque limiter.

16. The power generating and propelling system of a vessel as set forth in claim 10, wherein the rotary shaft of the electric motor transfers power to the power transmission device through an elastic joint.

17. The power generating and propelling system of a vessel as set forth in claim 10, wherein the rotary shaft of the electric motor transfers power to the power transmission device through a clutch.

18. The power generating and propelling system of a vessel as set forth in claim 10, wherein cooling water for cooling the internal combustion engine is passed near the electric motor.

19. The power generating and propelling system of a vessel as set forth in claim 18, wherein the cooling water is taken in from the outside of a propelling machine of the vessel.

20. The power generating and propelling system of a vessel as set forth in claim 18, wherein the cooling water is circulated in a closed circuit provided within a propelling machine of the vessel.

\* \* \* \* \*